(12) United States Patent
Matsushima et al.

(10) Patent No.: US 9,291,130 B2
(45) Date of Patent: Mar. 22, 2016

(54) SADDLE-RIDE TYPE VEHICLE

(71) Applicants: HONDA MOTOR CO., LTD., Tokyo (JP); TORAY INDUSTRIES, INC., Tokyo (JP)

(72) Inventors: Satoshi Matsushima, Wako (JP); Takaaki Hashimoto, Wako (JP); Hiroki Wakabayashi, Nagoya (JP)

(73) Assignees: HONDA MOTOR CO., LTD., Tokyo (JP); TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 14/477,544

(22) Filed: Sep. 4, 2014

(65) Prior Publication Data

US 2015/0060178 A1   Mar. 5, 2015

(30) Foreign Application Priority Data

Sep. 5, 2013   (JP) ................. 2013-184283

(51) Int. Cl.

| B62J 1/08 | (2006.01) |
|---|---|
| F02M 35/04 | (2006.01) |
| B62K 11/04 | (2006.01) |
| F02M 35/16 | (2006.01) |
| B62J 1/12 | (2006.01) |
| B62K 19/30 | (2006.01) |

(52) U.S. Cl.
CPC ................ *F02M 35/048* (2013.01); *B62J 1/12* (2013.01); *B62K 11/04* (2013.01); *B62K 19/30* (2013.01); *F02M 35/162* (2013.01)

(58) Field of Classification Search
CPC ........... B62K 19/30; B62K 11/04; B62J 1/08; B62J 1/12
USPC ........................................................ 297/195.1
See application file for complete search history.

(56) References Cited

U.S. PATENT DOCUMENTS

| 4,735,275 | A | * | 4/1988 | Tsukahara | ............... | B62K 5/01 180/215 |
|---|---|---|---|---|---|---|
| 2009/0242313 | A1 | * | 10/2009 | Morita | .................... | B62K 19/12 180/312 |
| 2011/0232987 | A1 | * | 9/2011 | Chipp | ........................ | B62J 1/12 180/311 |
| 2013/0278025 | A1 | * | 10/2013 | Wakabayashi | ......... | B62K 19/16 297/195.1 |
| 2014/0262580 | A1 | * | 9/2014 | Bagnariol | .............. | B60G 7/006 180/218 |
| 2015/0060177 | A1 | * | 3/2015 | Matsushima | ...... | F02M 35/0201 180/219 |

FOREIGN PATENT DOCUMENTS

JP    2012-137139 A    7/2012

* cited by examiner

*Primary Examiner* — Tony Winner
(74) *Attorney, Agent, or Firm* — Birch, Stewart, Kolasch & Birch, LLP

(57) ABSTRACT

A two-wheeled motor vehicle includes a seat frame supporting a seat. A metal collar incorporated in the seat frame has a cylindrical shape and is covered by a resin member. The seat frame is fastened at its lower and upper fastening portions to a vehicle body frame of the motor vehicle. The seat frame has a degradation indicating part for indicating degradation of the seat frame when the resin member located at an inner diameter side of the metal collar deforms under a predetermined load to allow the upper fastening portions on the lower fastening portions.

8 Claims, 7 Drawing Sheets

FIG.2

SADDLE-RIDE TYPE VEHICLE

FIELD OF THE INVENTION

The present invention relates to an improvement in a fastening structure for fastening a resin member to a vehicle body frame of a saddle-ride type vehicle.

BACKGROUND OF THE INVENTION

In a structure for fastening a resin member (or a fiber-reinforced resin member) to a companion member, a metal collar is incorporated in the resin member to prevent deformation etc. of the resin member and a screw is inserted through the metal collar to fasten the resin member to the companion member, as disclosed in JP-A-2012-137139.

JP-A-2012-137139 teaches that a tubular metal member is incorporated in a resin member, and a collar is pressed in a hole of the metal member. A fastener is inserted through the collar to fasten the resin member to a companion member.

In the technique taught in JP-A-2012-137139, when the resin member is degraded under an excess load or due to a long-term use etc., it is not easy to confirm the degradation of the resin member from the outside.

Where a saddle-ride type vehicle for a rider to sit astride uses the technique of JP-A-20120137139 to apply the resin member to a seat frame supporting a seat for the rider to sit, for example, it is not easy to confirm that the resin member is degraded.

There is a need for a technique capable of easily confirming the degradation of the seat frame.

SUMMARY OF THE INVENTION

An object of the present invention is to provide a saddle-ride type vehicle with a technique capable of easily confirming degradation of a resinous seat frame of the vehicle.

According to one aspect of the present invention, there is provided a saddle-ride type vehicle comprising: a front wheel; a handlebar for steering the front wheel; a rear wheel; a power unit for driving the rear wheel; a vehicle body frame supporting the front wheel, the handlebar, the rear wheel and the power unit, the vehicle body frame having a rear part; a seat for a rider to straddle in steering the vehicle; a seat frame supporting the seat, the seat frame being primarily made of a resin member and having a fastening portion incorporating a metal collar therein, the seat frame being fastened at the fastening portion to the rear part of the vehicle body frame; the resin member covering the metal collar in a direction in which the seat frame is fastened to the rear part of the vehicle body frame; and the seat frame having a degradation indicating part for indicating degradation of the seat frame when the resin member deforms at an inner diameter side of the metal collar under a predetermined load to allow movement of the fastening portion.

The seat frame has the degradation indicating parts for indicating the degradation of the seat frame upon the movements of the fastening portions. The movements of the fastening portions change visual appearances of the degradation indicating parts. Because of the change in the visual appearances of the degradation indicating parts, it is easy to confirm the degradation of the seat frame from the outside of the vehicle.

Preferably, the vehicle further comprises a fastener inserted through the fastening portion in a lateral direction of the vehicle to fasten the fastening portion to the rear part of the vehicle body frame.

Inserting the fastener in the lateral direction of the vehicle facilitates doing the fastening work from the lateral side of the vehicle. This results in reducing the number of the fastening steps as well as assuring the attachment accuracy.

Preferably, the fastening portion is plural in number, the plural fastening portions comprising a lower fastening portion and an upper fastening portion located above the lower fastening portion, and the degradation indicating part is provided at either the lower fastening portion or the upper fastening portion, the degradation indicating part being movable in a direction perpendicular to a line connecting the upper fastening portion to the lower fastening portion.

The degradation indicating parts are provided at either the lower fastening portions or the upper fastening portions. The fastening portions having the degradation indicating parts are pivotable on the remaining fastening portions, which do not have the degradation indicating parts, in the directions perpendicular to the lines connecting the lower fastening portions to the upper fastening portions. As a result, an amount of movement of the entire seat frame is smaller than if both the lower fastening portions and the upper fastening portions are movable.

Preferably, the seat has a seating location for the rider to sit, the seating location being located rearwardly of the fastening portion when the seating location is viewed in side elevation.

Since the seating location is located rearwardly of the fastening positions when viewed in side elevation, the vehicle body frame of heavy weight need not be lengthened in a rear direction of the vehicle. This leads to reduction in size and weight of the vehicle body frame.

Preferably, the degradation indicating part is provided at the upper fastening portion.

When a force is applied to the seat frame, an upper portion of the seat frame is moved in a front-rear direction of the vehicle. Due to this movement of the upper portion of the seat frame, the rider sitting on the seat disposed on a top of the seat frame can more easily notice the movement of the seat frame than if the degradation indicating parts are provided at the lower fastening portions.

Preferably, the upper fastening portion is located forwardly of the lower fastening portion, and the metal collar has a hole elongated in a front-rear direction of the vehicle, the resin member covering the elongated hole in an axial direction of the fastener, the resin member having a circular hole coaxial with a center of a rear side of the elongated hole, the fastener being inserted through the circular hole, the resin member having a portion located forwardly of the circular hole and covering the elongated hole, the portion of the resin member providing the degradation indicating part.

The resin member covers the elongated holes in the axial directions of the fasteners, the resin member has the circular holes coaxial with the centers of the rear sides of the elongated holes, and the fasteners are inserted through the circular holes. When an excess force is applied to the seat frame, the seat frame is moved in a rear direction of the vehicle along the elongated holes. Since the specific portions of the resin member covering the front sides of the elongated holes provide the degradation indicating parts, it is possible to easily confirm degradation of the seat frame from the outside of the vehicle.

Preferably, the vehicle is an off-road two-wheeled motor vehicle, and the seat frame is configured to bear a vertical load from the rider.

The load borne by the seat frame is limited to the vertical load from the rider. Thus, it is possible to accurately set a vertical load without taking account of loads applied in other directions such as a lateral direction of the vehicle.

Preferably, the seat frame has a box-shaped structure including a top surface and lateral surfaces extending downwardly from left and right ends of the top surface and connected to lateral surfaces of the seat, the top surface having an opening portion to be open upon removal of the seat, the seat frame has an air cleaner element disposed laterally inwardly of the lateral surfaces of the seat frame for filtering an air to be taken in by the power unit.

The seat frame has the box-shaped structure including the top surface and the lateral surfaces extending downwardly from the left and right ends of the top surface and connected to the lateral surfaces of the seat, and the seat frame has the air cleaner element disposed laterally inwardly of the lateral surfaces. Such a structure of the seat frame eliminates the need for a separate side cover or air cleaner case. This results in reducing the number of the components. Since the top surface of the seat frame has the opening portion, the air cleaner element disposed inwardly of the lateral surfaces can be easily visually checked through the opening portion. This results in improving maintainability of the air cleaner.

BRIEF DESCRIPTION OF THE DRAWINGS

A certain preferred embodiment of the present invention will hereinafter be described in detail, by way of example only, with reference to the accompanying drawings, in which:

FIG. 2 is an exploded view of a relevant part of the vehicle to the present invention;

DETAILED DESCRIPTION OF THE PREFERRED EMBODIMENT

Figure 1:
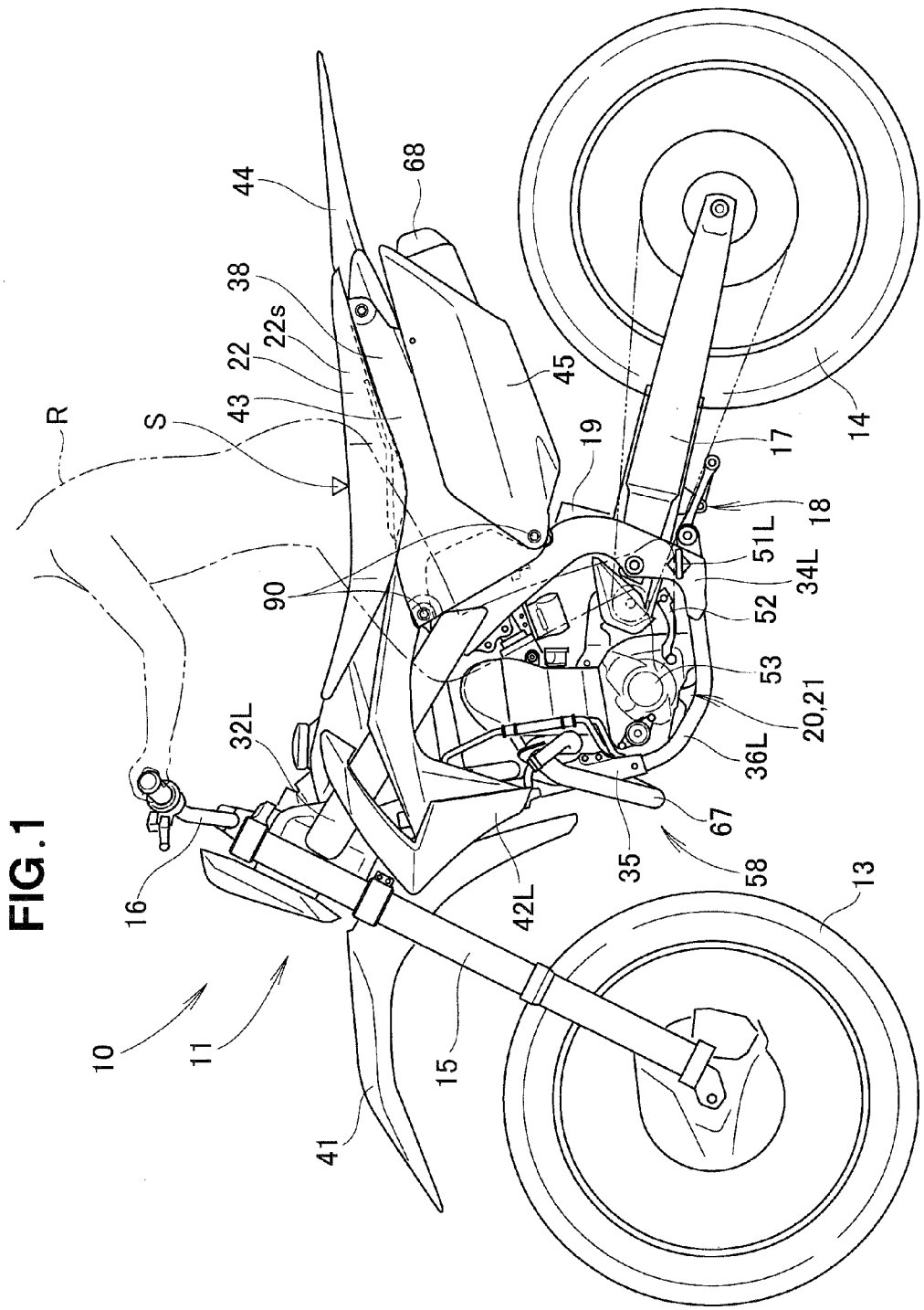
FIG. 1 is a left side elevation view of a two-wheeled motor vehicle according to the present invention.

As shown in FIG. 1, a motorcycle, or two-wheeled motor vehicle 10 includes a vehicle body frame 11 supporting a power unit 20, a front fork 15 disposed at a front end of the vehicle body frame 11 and supporting a front wheel 13, a handlebar 16 attached to an upper end of the front fork 15 to be gripped by a driver or rider to steer the front wheel 13, and a swing arm 17 extending rearwardly from the vehicle body frame 11 and supporting a rear wheel 14 in such a manner as to allow the rear wheel to vertically pivot. The vehicle 10 also includes a link mechanism 18 interposed between the swing arm 17 and the vehicle body frame 11 and supporting the swing arm 17 in such a manner as to allow pivotal movement of the swing arm 17. The vehicle 10 also further includes a rear cushion 19 and a seat 22 disposed between the front wheel 13 and the rear wheel 14. The vehicle 10 is a saddle-ride type vehicle on which the rider rides straddling the seat 22. The saddle-ride type vehicle 10 is suitable for traveling on a rough terrain.

Figure 2:
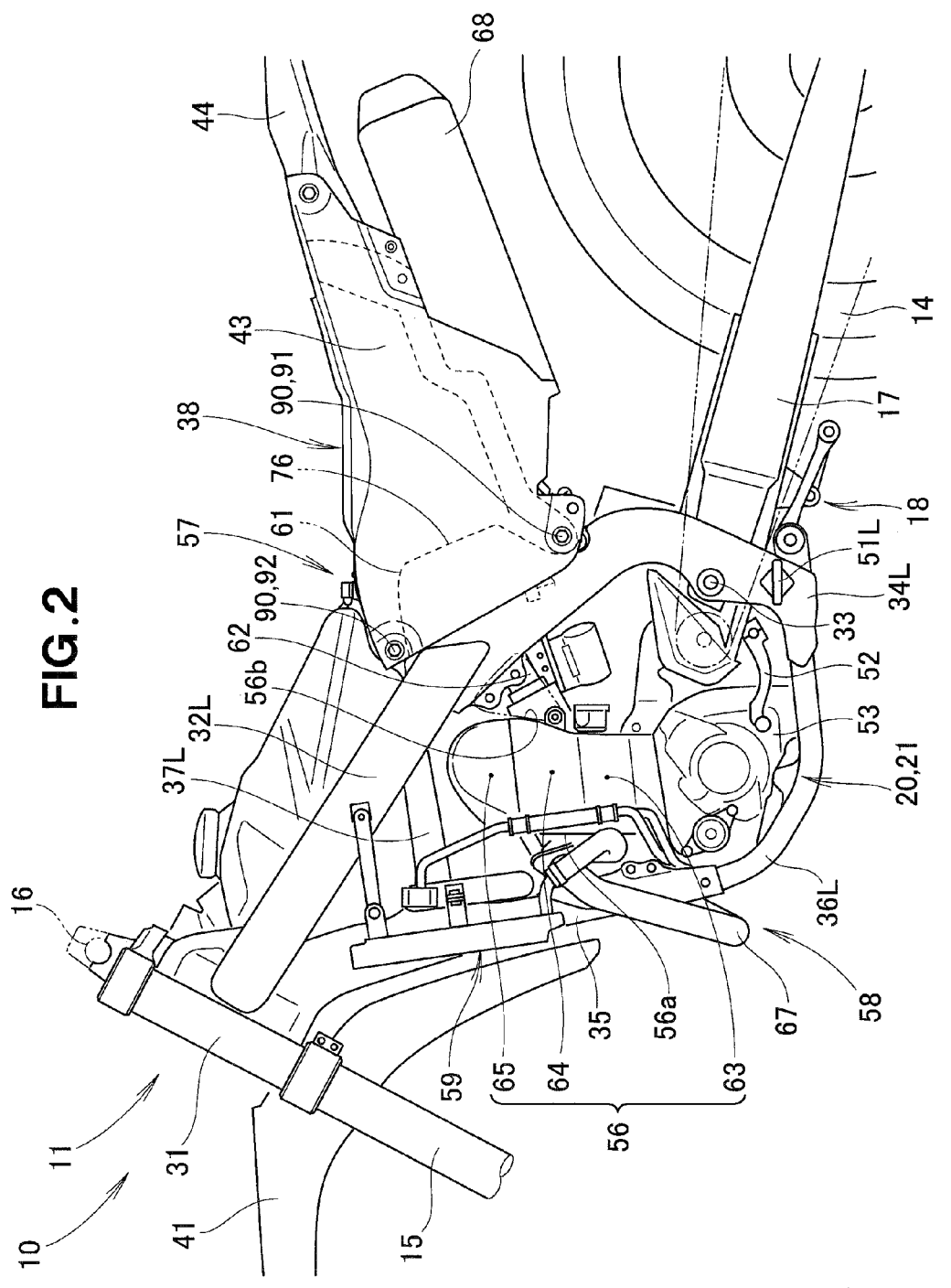

As shown in FIG. 2, the vehicle body frame 11 includes a head pipe 31 supporting the front wheel 13 (FIG. 1) in such a manner as to allow steering of the front wheel 13, and left and right main frames (only left one 32L shown) extending rearwardly downwardly from the head pipe 31 and supporting the power unit (provided by an engine 21). The vehicle body frame 11 also includes pivot frames (only one 34L shown) extending rearwardly downwardly from rear ends of the main frames and supporting the swing arm 17 through a pivot shaft 33. The vehicle body frame 11 further includes a down tube 35 extending downwardly from the head pipe 31, and under frames (only one 36L shown) branching off from the down tube 35, then extending rearwardly and connected to lower ends of the pivot frames. The vehicle body frame 11 further includes sub-frames (only one 37L shown) interconnecting the down tube 35 and the main frames. The vehicle body frame 11 further includes a seat frame 38 extending rearwardly from the rear ends of the main frames and supporting the seat 22 which the rider sits astride. The seat frame 38 is disposed at a rear part of the vehicle body frame 11 for bearing, primarily, a vertical load.

The front fork 15 is steerably supported by the head pipe 31. The front wheel 13 is rotatably attached to a lower end of the front fork 15. The handlebar 16 for steering the front wheel 13 is attached to the upper end of the front fork 15. The rear wheel 14 is rotatably attached to a rear end of the swing arm 17.

From the foregoing, in summary, the vehicle body frame 11 supports the front wheel 13 and the handlebar 16, supports the rear wheel 14 through the swing arm 17, and supports the power unit 20 for driving the rear wheel 14. It is noted that a lower side cover 45 (FIG. 1) is removed from FIG. 2.

Referring back to FIG. 1, a front fender 41 is attached to the front fork 15 for preventing scatter of mud thrown up by the front wheel 13. Radiator shrouds (only one 42L shown) are positioned above the power unit 20 and on opposite sides of the vehicle body frame 11. A side cover 43 is contiguous with rear ends of the radiator shrouds and continuously rearwardly extends below the seat 22. The side cover 43 is disposed integrally with the seat frame 38. A rear fender 44 contiguous with a rear end of the side cover 43 extends continuously rearwardly for preventing scatter of mud thrown up by the rear wheel 14. The lower side cover 45 is attached to the side cover 43 in an overlapping relationship with a lower half of the side cover 43.

In vicinities of lower ends of the left and right pivot frames, steps (only left one 51L shown) for the rider to rest his feet extend in a lateral outward direction of the vehicle. In front of the left step 51L, a change pedal 52 is disposed on a crankcase 53 of the engine 21.

Referring back to FIG. 2, the engine 21 is a water-cooled engine providing the power unit 20. The engine 21 includes the crankcase 53 and a cylinder portion 56 extending upwardly from the crankcase 53. The engine 21 further includes an intake system 57 disposed rearwardly of the cylinder portion 56 and connected to a rearward-facing rear surface 56b of the cylinder portion 56, an exhaust system 58 extending from a forward-facing front surface 56a of the cylinder portion 56, and a radiator unit 59 disposed forwardly of the cylinder portion 56.

The intake system 57 includes an air cleaner 61 disposed in the seat frame 38 formed integrally with the side cover 43, and a throttle body 62 connected to the air cleaner 61 for supplying a predetermined air-fuel mixture. The throttle body 62 has a front end connected to the rear surface 56b of the cylinder portion 56. The exhaust system 58 includes an exhaust pipe 67 extending from the front surface 56a of the cylinder portion 56, and a silencer 68 disposed behind the exhaust pipe.

The cylinder portion 56 includes a cylinder body 63, a cylinder head 64, and a head cover 65. The cylinder body 63, the cylinder head 64 and the head cover 65 are stacked in this order one on top of another, and the cylinder portion 56 is placed atop and fastened to the crankcase 53. Although the power unit is provided by the engine in this embodiment, the power unit may be a hybrid unit provided by a combination of an engine and a motor, or a motor unit.

The seat frame 38 formed integrally with the side cover 43 is discussed below.

Figure 3:
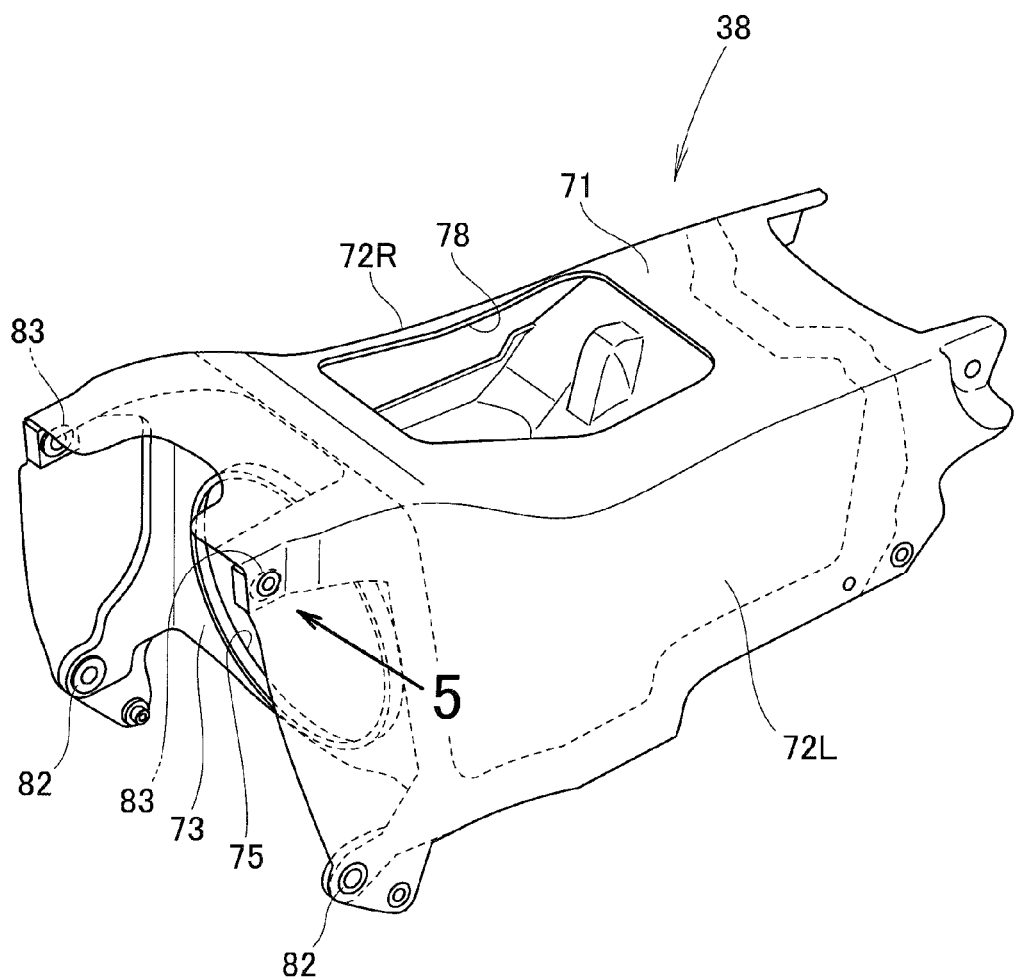
FIG. 3 is a perspective view of a seat frame of the vehicle.

As shown in FIG. 3, the seat frame 38 is of box-shaped structure including a top surface 71, lateral surfaces 72L, 72R extending downwardly from left and right ends of the top surface 71, and a vertically extending front surface 73 interconnecting front portions of the lateral surfaces 72L, 72R and a front portion of the top surface 71. Referring also to FIG. 1, the lateral surfaces 72L, 72R are smoothly connected to and extend from lateral surfaces (only one shown) 22s of the seat 22.

Figure 4:
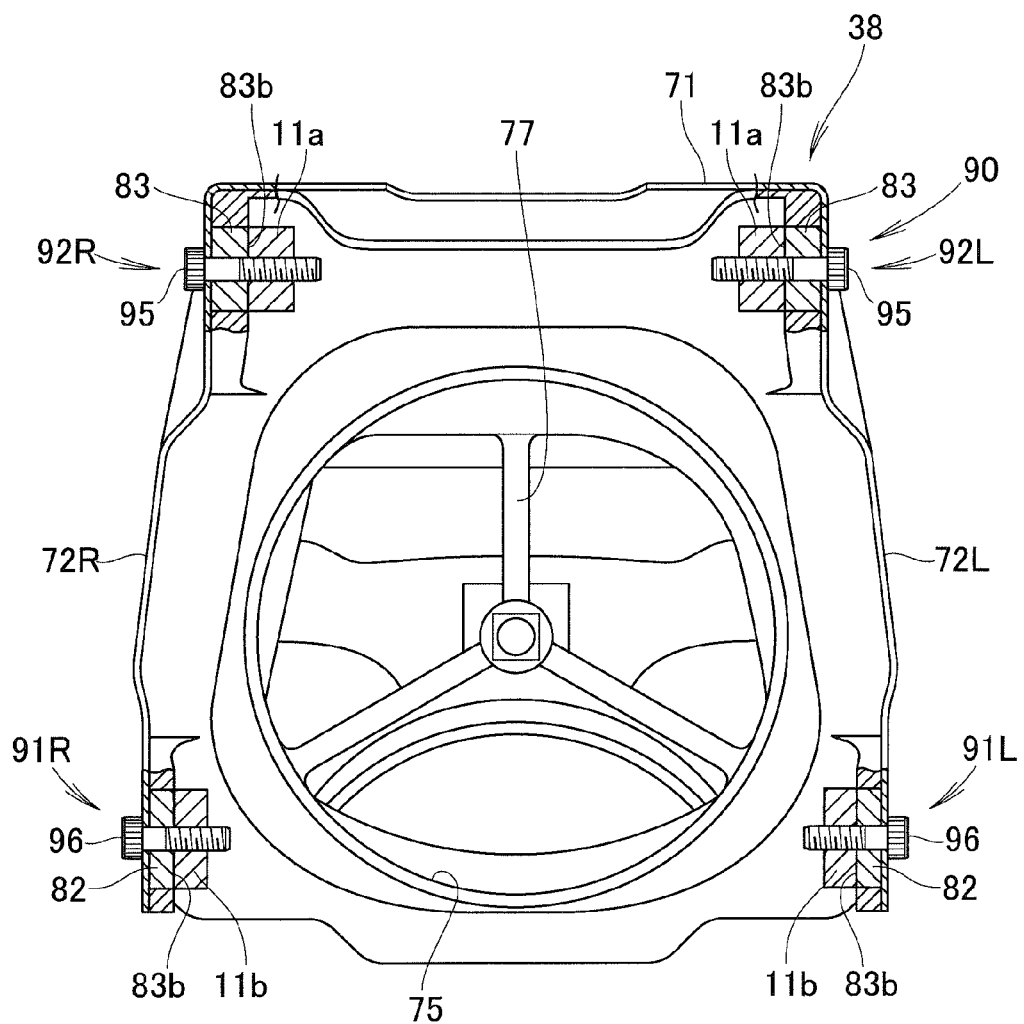
FIG. 4 is a front elevation view of the seat frame having a structure to be attached to a vehicle body frame.

The front surface 73 of the seat frame 38 defines a circular cleaner outlet 75 connected to the throttle body 62. As shown in FIG. 4, an element mounting member 77, to which an air element 76 (FIG. 2) for filtering an air to be taken in by the power unit is mounted, is provided behind the cleaner outlet 75 and laterally inwardly of the lateral surfaces 72L, 72R.

The top surface 71 of the seat frame 38 has an opening portion 78 to be open upon removal of the seat 22 (FIG. 1) to make the element mounting member 77 and the air cleaner element 76 mounted to the member 77 viewable.

The seat frame 38 formed integrally with the side cover 43 and supporting the seat 22 for the rider to sit is formed of carbon fiber reinforced plastic (CFRP) made of a combination of carbon fiber base material and carbon-fiber-reinforcement resin.

A process for manufacturing the seat frame 38 employed in the embodiment includes providing a carbon fiber base material, setting a metal collar 83 in the carbon fiber base material, and preforming the carbon fiber base material. In this process, then an injection-molded product (resin member) formed by injection-molding a carbon-fiber-reinforced resin pellet is provided. Finally, the preformed carbon fiber base material is covered with the resin member and adhered thereto by an adhesive to thereby form the seat frame 38.

Since the seat frame 38 contains carbon fiber forming the frame, side cover and air cleaner case which are integral with one another, there is no need to provide a side cover and an air cleaner, separately. This results in reducing the number of components and thus the number of steps of the assemblage.

Since the seat frame 38 is formed of the carbon fiber including the resin member, significant reduction in weight can be achieved unlike a conventional a combination of a metal member and a resin member.

Since the top surface 71 of the seat frame 38 has the opening portion 78, it is possible to visually check the air cleaner element 76, disposed inwardly of the lateral surfaces 72L, 72R, through the opening portion 78, thereby improving maintainability of the air cleaner 61.

Next, a fastening structure of the seat frame 38 is discussed below.

As shown in FIG. 4, the seat frame 38 has fastening portions 90 at upper and lower sites of a front end thereof for attaching the seat frame 38 to the vehicle body frame 11. The fastening portions 90 are lower fastening portions 91L, 91R and upper fastening portions 92L, 92R located above the lower fastening portions 91L, 91R. As is clear from FIG. 2, the upper fastening portions 92L, 92R are located forwardly of the lower fastening portions 91L, 91R.

The upper fastening portions 92L, 92R and the lower fastening portions 91L, 91R are attached to the vehicle body frame 11 by fasteners 95 inserted in a lateral direction of the vehicle 10. In the upper fastening portions 92L, 92R provided by a resin member 84 (FIG. 5) of the seat frame 38, the metal collar 83 is incorporated as a cast-in insert. In the lower fastening portions 91L, 91R, a metal collar 82 is incorporated as a cast-in insert. These metal collars have lateral inner surfaces 83b on flange portions 11a, 11b forming parts of the vehicle body 11, and the fasteners or bolts 95, 96 are inserted from a lateral outward direction of the vehicle through the collars and the flange portions and threadedly engage inner threads formed on flange portions 11a, 11b to fasten the seat frame 38 to the vehicle body 11.

Since the bolts 95, 96 fasten the seat frame 38 to the vehicle body 11 by being inserted from the lateral outward direction of the vehicle, the seat frame 38 can be easily replaced in a reduced time when the resin member of the seat frame 38 is degraded. In other words, the fastening portions 90 are attached to the vehicle body 11 by the fasteners 95, 96 inserted in a lateral direction of the vehicle. The fasteners 95, 96 to be inserted in the lateral direction of the vehicle facilitate the work of fastening the seat frame 38 to the vehicle body 11 from the lateral direction of the vehicle as well as assuring the attachment accuracy.

A structure of the upper fastening portion 92L having a degradation indicating part 100 is discussed in detail below. It is noted that the degradation indicating part 100 of the upper fastening portion 92L is discussed for illustrative purposes, and the upper fastening portion 92R has the degradation indicating part, too.

Figure 5:
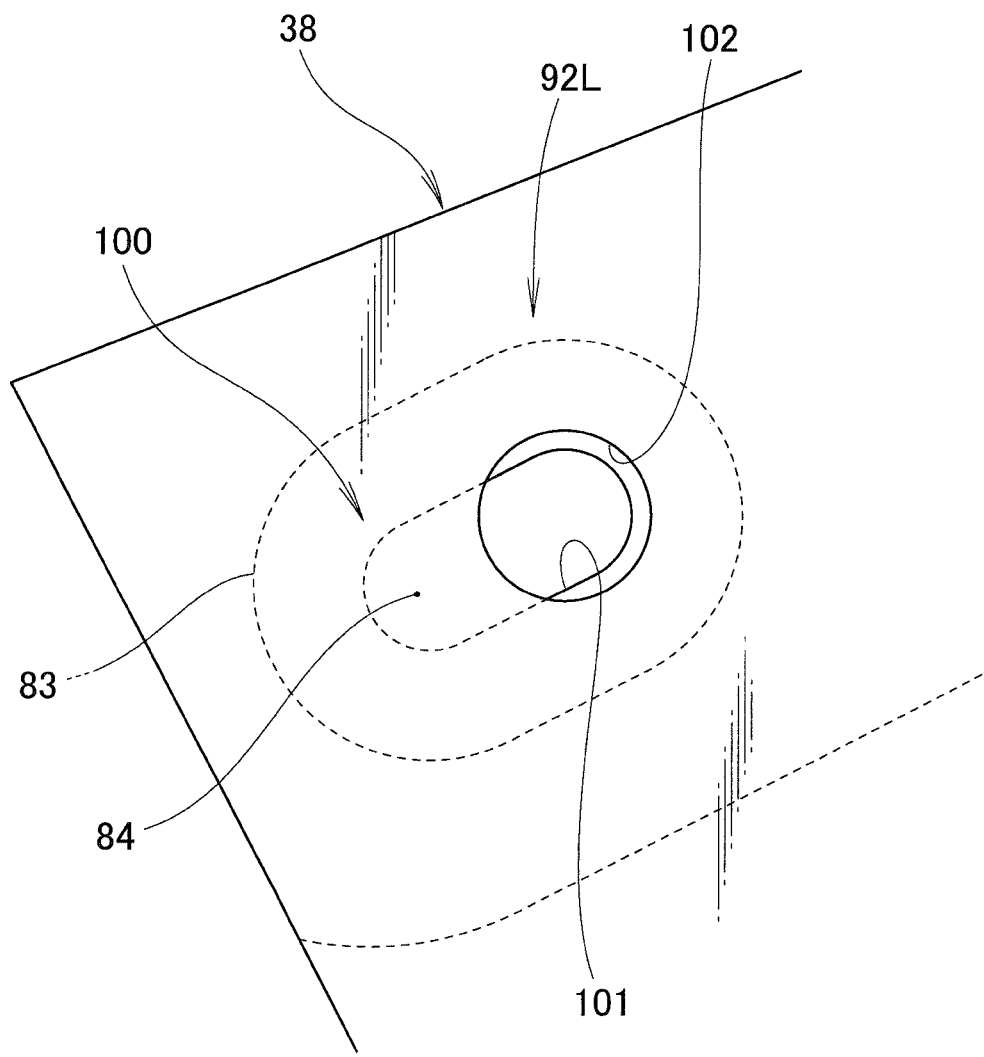
FIG. 5 is an exploded view of a portion of the seat frame indicated by an arrow 5 of FIG. 3.

As shown in FIG. 5, the resin member 84 covers the metal collar 83 in a direction to fasten the seat frame 38 to the vehicle body such that the metal collar 83 is incorporating in the resin member 84. This metal collar 83 has a hole 101 elongated in a front-rear direction of the vehicle. The elongated hole 101 has a front half closed by the resin member 84. The degradation indicating part 100 for indicating degradation of the seat frame 38 is provided by a portion of the resin member 84, which portion faces laterally outwardly of the vehicle and covers the elongated hole 101.

The degradation indicating part 100 of the seat frame 38 indicates degradation of the seat frame 38 when the fastening portion 90 is forced to move upon deformation of the resin member 84 under a predetermined load at a site of the resin member 84 located on a side of a space having an inner diameter of the (upper) metal collar 83.

Figure 6A:
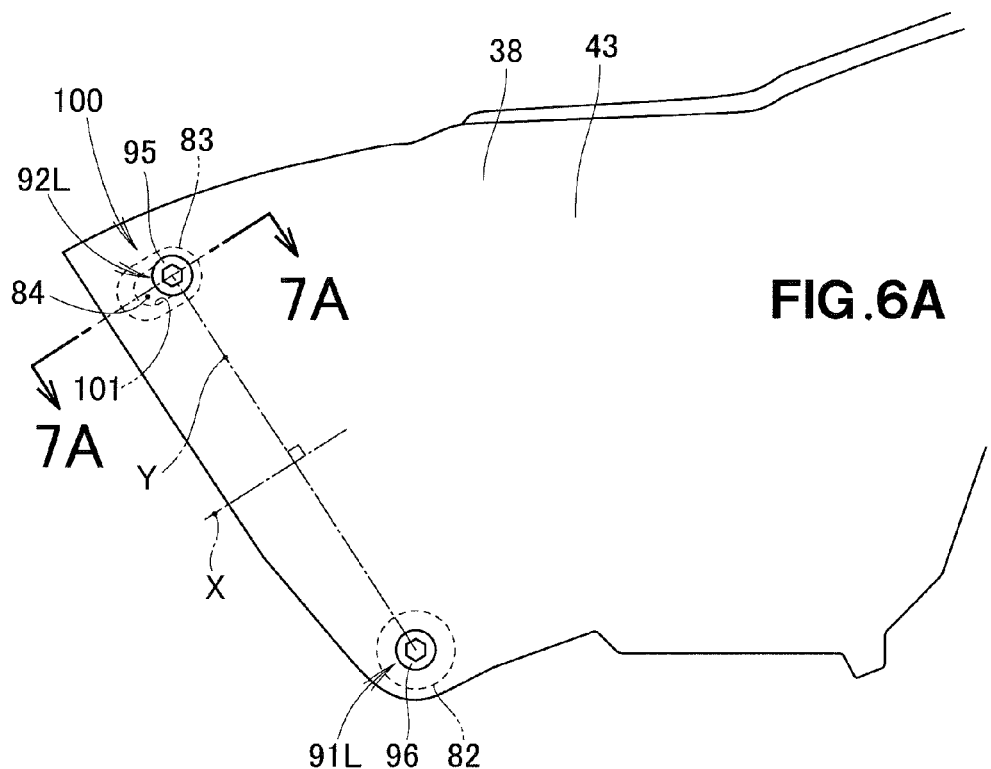
FIG. 6A is a view showing fastening portions before deformation of the seat frame.
Figure 6B:
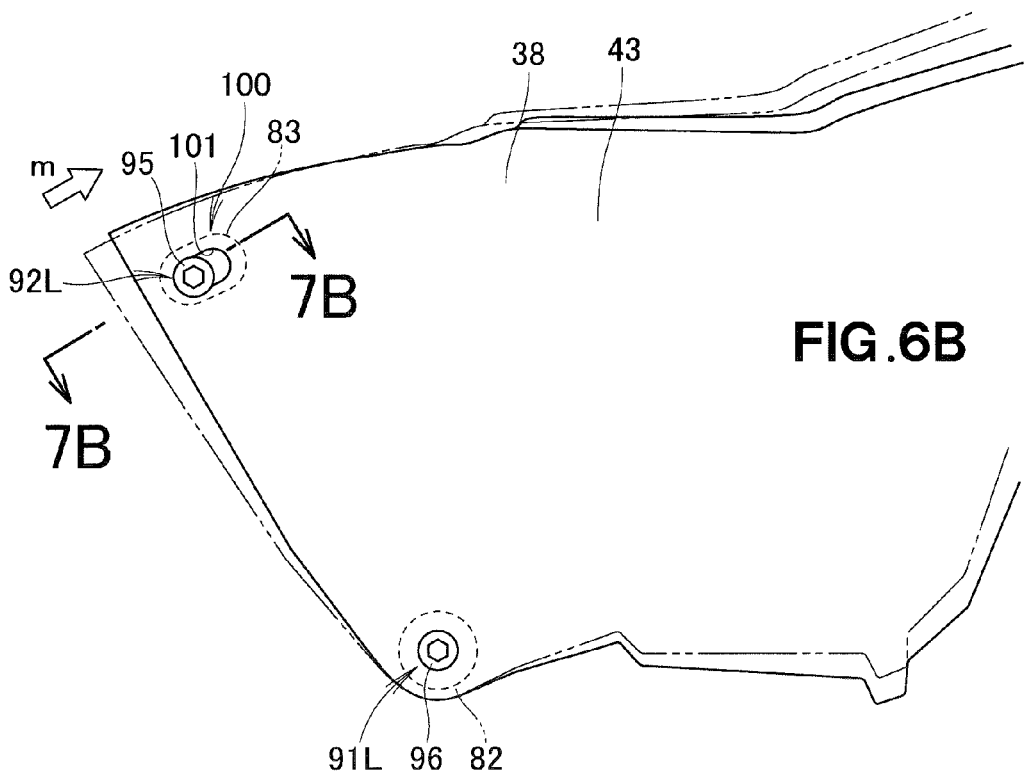
FIG. 6B is a view showing the fastening portions after the deformation of the seat frame.

FIG. 6A shows the seat frame prior to deformation and FIG. 6B shows the seat frame deformed.

Referring to FIG. 6A, the degradation indicating part 100 extends in a direction perpendicular to a line Y interconnecting the lower fastening portion 91L and the upper fastening portion 92L. That is, the degradation indicating part 100 is oriented in the direction perpendicular to the line Y interconnecting the lower fastening portion 91L and the upper fastening portion 92L. It is noted that although the degradation indicating part 100 are provided at the upper fastening portions 92L in the embodiment, the degradation indicating part 100 may be provided at the lower fastening portions 91L, 91R rather than at the upper fastening portions 92L, 92R.

Referring also to FIG. 5, the metal collar 83 has the hole (an oval hole) 101 elongated in the front-rear direction of the vehicle. The resin member 84 of the seat frame 38 covers the elongated hole 101 in an axial direction of the fastener 95, and the resin member 84 has a circular hole (a precise circular hole) 102 coaxial with a center of a rear side of the elongated hole 101. The fastener 95 is inserted through the circular hole 102.

As shown in FIG. 6B, the upper fastening portion 92L undergoes a pivotal movement on the lower fastening portion 91L, in a direction of an arrow m. The pivotal movement of the upper fastening portion 92L breaks the degradation indicating part 100 provided at the upper fastening portion 92L, thereby changing a visual appearance of the degradation indicating part 100. Because of the change in the visual appearance of the degradation indicating part 100, it is easy to confirm degradation of the seat frame 38 from the outside of the vehicle.

When an excess force is applied to the seat frame 38, the seat frame 38 is moved along the elongated hole 101 in a rear direction of the vehicle. Since the degradation indicating part 100 is provided at a specific location covering a front side of the elongated hole 101, it is possible to easily confirm degradation of the seat frame 38 from the outside of the vehicle.

Figure 7A:
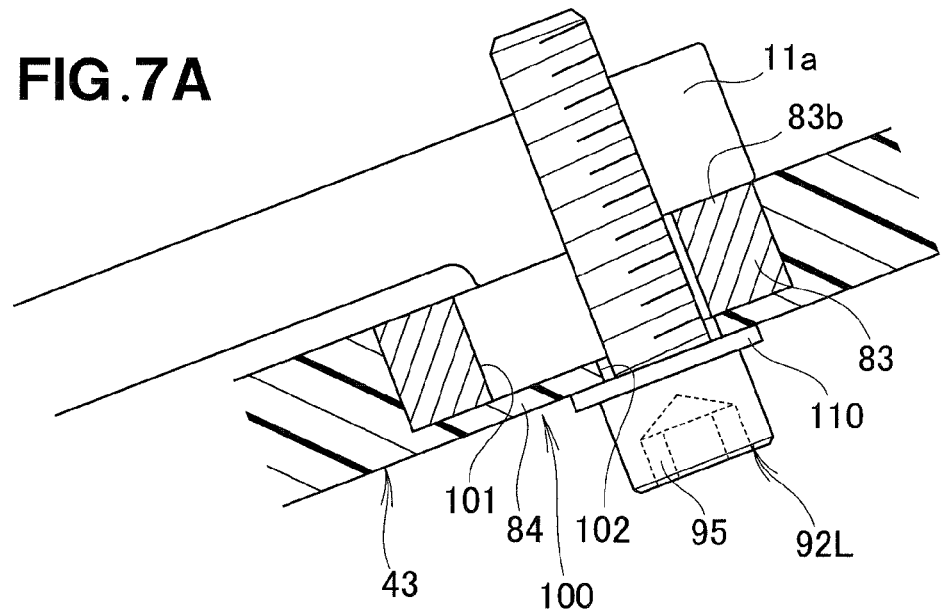
FIG. 7A is a cross-sectional view taken along line 7A-7A of FIG. 6A.

Turning to FIG. 7A, before deformation of the seat frame, the resin member 84 covers the elongated hole 101, except for the portion defining the circular hole 101 through which a threaded shank of the fastener 95 passes.

Figure 7B:
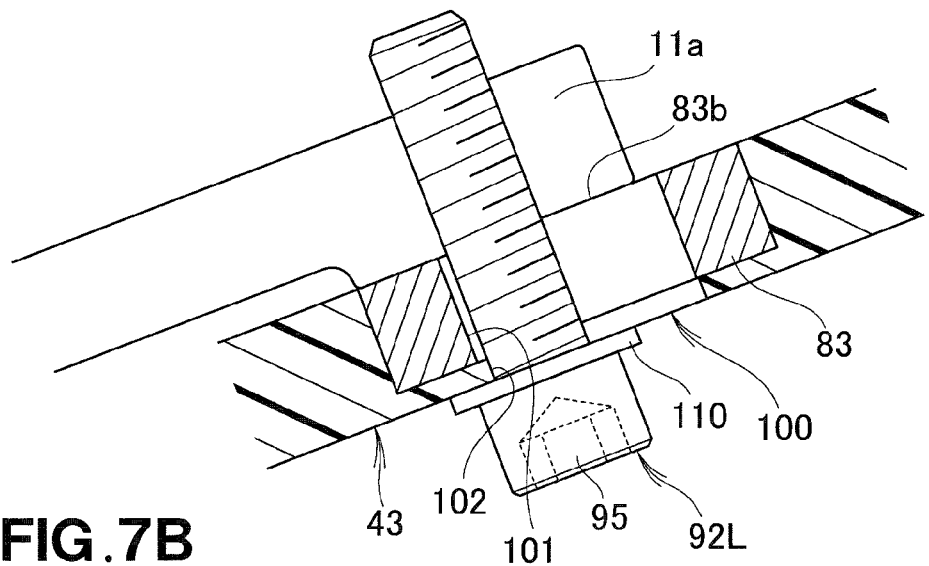
FIG. 7B is a cross-sectional view taken along line 7B-7B of FIG. 6B.

Turning to FIG. 7B, after the deformation of the seat frame, the seat frame 38 has been displaced in the rear direction of the vehicle, wherein the resin member 84, which covered the elongated hole 101 before the deformation of the seat frame, is broken. This makes it possible to readily confirm degradation of the seat frame 38 from the outside of the vehicle. Reference numeral 110 designates a washer.

Referring to FIGS. 6A and 6B, the degradation indicating part 100 is provided at each of the upper fastening portions 92L, 92R. When a force is applied to the seat frame 38, an upper portion of the seat frame 38 is moved in the front-rear direction of the vehicle, and thus the rider sitting on the seat 22 attached to the upper portion of the seat frame 38 can easily notices the movement of the seat frame 38. As a result, degradation of the seat frame 38 can be easily found.

The degradation indicating part 100 is provided at either each lower fastening portion or each upper fastening portion. That is, one of the upper and lower fastening portions is pivotable on the other fastening portion in a direction perpendicular to the line Y interconnecting the lower and upper fastening portions. As a result, an amount of movement of the entire seat frame 38 is smaller than if the lower and upper fastening portions are both moved together.

A load borne by the seat frame 38 is limited to a vertical load from a driver or rider R. Thus, it is possible to accurately set a vertical load without taking account of loads applied in other directions such as a lateral direction of the vehicle.

It is noted that the resin member used in the seat frame of the present invention is a resin reinforced by reinforcing fibers. In the embodiment, carbon fibers are used as the reinforcing fibers. It is noted that the reinforcing fibers may be optional one or more kinds of fibers selected from inorganic fibers such as glass fibers, alumina fibers and metal fibers and organic resins such as fluorine-based resin and phenol-based resins. These reinforcing fibers may take a variety of forms such as a woven fabric and a nonwoven fabric.

In the embodiment, the fiber base material is a sheet-shaped carbon fiber base material. It is noted that the fiber base material may be reinforced fibers not impregnated with resin, taking homogeneous forms of short fibers such as chopped fibers and a nonwoven fabric.

Referring back to FIG. 1, a seating location S for the rider to sit is located rearwardly of the fastening portions 90 when the vehicle is viewed in side elevation. Since the seating location S is located rearwardly of the fastening portions 90, the vehicle body frame 11 of heavy weight need not be lengthened in the rear direction of the vehicle. This leads to the vehicle body frame 11 being reduced in size and weight.

Although the present invention has been discussed as being applied to the two-wheeled motor vehicle in the embodiment, the present invention may be applied to a saddle-ride type three-wheeled vehicle or other common saddle-ride type vehicles.

The present invention is suitable for use in a two-wheeled motor vehicle having a rear frame formed of a resin.

Obviously, various minor changes and modifications of the present invention are possible in the light of the above teaching. It is therefore to be understood that within the scope of the appended claims the invention may be practiced otherwise than as specifically described.

What is claimed is:

1. A saddle-ride vehicle comprising:
 a front wheel;
 a handlebar for steering the front wheel;
 a rear wheel;
 a power unit for driving the rear wheel;
 a vehicle body frame supporting the front wheel, the handlebar, the rear wheel and the power unit, the vehicle body frame having a rear part;
 a seat for a rider to straddle in steering the vehicle;
 a seat frame supporting the seat, the seat frame being primarily made of a resin member and having at least one fastening portion incorporating a metal collar therein, the seat frame being fastened at the at least one fastening portion to the rear part of the vehicle body frame;
 the resin member covering the metal collar in a direction in which the seat frame is fastened to the rear part of the vehicle body frame; and
 the seat frame having a degradation indicating part for indicating degradation of the seat frame when the resin member deforms at an inner diameter side of the metal collar under a predetermined load to allow movement of the fastening portion.

2. The saddle-ride vehicle according to claim 1, further comprising a fastener inserted through the fastening portion in a lateral direction of the vehicle to fasten the fastening portion to the rear part of the vehicle body frame.

3. The saddle-ride vehicle according to claim 2, wherein the at least one fastening portion further comprising a lower fastening portion and an upper fastening portion located above the lower fastening portion, and
 wherein the degradation indicating part is provided at either the lower fastening portion or the upper fastening portion, the degradation indicating part being movable in a direction perpendicular to a line connecting the upper fastening portion to the lower fastening portion.

4. The saddle-ride vehicle according to claim 3, wherein the upper fastening portion is located forwardly of the lower fastening portion, and
 wherein the metal collar has a hole elongated in a front-rear direction of the vehicle, the resin member covering the elongated hole in an axial direction of the fastener, the resin member having a circular hole coaxial with a center of a rear side of the elongated hole, the fastener being inserted through the circular hole, the resin member having a portion located forwardly of the circular hole and covering the elongated hole, the portion of the resin member providing the degradation indicating part.

5. The saddle-ride vehicle according to claim 3, wherein the degradation indicating part is provided at the upper fastening portion.

6. The saddle-ride vehicle according to claim 1, wherein the seat has a seating location for the rider to sit, the seating location being located rearwardly of the fastening portion when the seating location is viewed in side elevation.

7. The saddle-ride vehicle according to claim 1, wherein the vehicle is an off-road two-wheeled motor vehicle, and the seat frame is configured to bear a vertical load from the rider.

8. The saddle-ride vehicle according to claim 1, wherein the seat frame has a box-shaped structure including a top surface and lateral surfaces extending downwardly from left and right ends of the top surface and connected to lateral surfaces of the seat, the top surface having an opening portion to be open upon removal of the seat, the seat frame has an air cleaner element disposed laterally inwardly of the lateral surfaces of the seat frame for filtering an air to be taken in by the power unit.

* * * * *